(12) United States Patent
Myers

(10) Patent No.: US 9,272,230 B2
(45) Date of Patent: Mar. 1, 2016

(54) OIL EXTRACTION DEVICE FOR USE AT HOME AND METHOD OF USE

(76) Inventor: Richard Myers, Paradise, CA (US)

( * ) Notice: Subject to any disclaimer, the term of this patent is extended or adjusted under 35 U.S.C. 154(b) by 1090 days.

(21) Appl. No.: 13/030,361

(22) Filed: Feb. 18, 2011

(65) Prior Publication Data
US 2012/0211697 A1  Aug. 23, 2012

(51) Int. Cl.
*B01D 11/02* (2006.01)
*C10G 1/04* (2006.01)
*B01D 3/40* (2006.01)

(52) U.S. Cl.
CPC .............. *B01D 11/0219* (2013.01); *B01D 3/40* (2013.01); *B01D 11/0215* (2013.01); *C10G 1/042* (2013.01); *B01L 2200/0631* (2013.01)

(58) Field of Classification Search
CPC ...... C10G 1/04; C10G 1/042; B01D 11/0215; B01D 11/0219; B01D 3/40; B01L 2200/0631
See application file for complete search history.

(56) References Cited

U.S. PATENT DOCUMENTS

| | | | | |
|---|---|---|---|---|
| 5,338,557 | A * | 8/1994 | Pare | 426/241 |
| 5,350,527 | A * | 9/1994 | Kitko | 210/804 |
| 5,458,897 | A * | 10/1995 | Pare | 426/241 |
| 5,516,923 | A * | 5/1996 | Hebert et al. | 554/12 |
| 5,853,726 | A * | 12/1998 | Chevereau | 424/401 |
| 6,890,424 | B1 * | 5/2005 | Wilde | 208/311 |
| 6,911,119 | B2 * | 6/2005 | Babu et al. | 202/83 |
| 7,002,029 | B2 * | 2/2006 | Davis | 554/16 |
| 7,198,808 | B2 * | 4/2007 | Krasutsky et al. | 424/769 |
| 8,092,752 | B2 * | 1/2012 | Davis | 422/198 |
| 8,282,788 | B2 * | 10/2012 | Lee | 202/169 |
| 8,282,789 | B2 * | 10/2012 | Lee | 202/170 |
| 2008/0128261 | A1 * | 6/2008 | Balass | 202/176 |
| 2011/0100894 | A1 * | 5/2011 | Miller | 210/236 |
| 2014/0001027 | A1 * | 1/2014 | Balass | 203/1 |

* cited by examiner

*Primary Examiner* — Renee E Robinson
*Assistant Examiner* — Jonathan Miller
(74) *Attorney, Agent, or Firm* — The Law Office of Jerry D. Haynes

(57) ABSTRACT

Described herein is an oil extraction device comprising a housing; a first trough resting within an upper portion of said housing, where said first trough holds a solvent; a heat source within said housing, where said heat source heats said first trough; a control device mounted within said housing, where said control device controls said heat source; a reservoir attached to said upper portion of said housing; a strainer basket positioned within said reservoir, where said strainer basket holds an extraction substance; a filter fitted within said strainer basket below said extraction substance; a second filter positioned above said extraction substance; a condenser positioned above said housing; a second trough positioned at a bottom portion of said condenser; and a set of flanges extruding from said condenser, where said set of flanges enable said condenser to cool and condense solvent vapor when operating said oil extraction device.

9 Claims, 5 Drawing Sheets

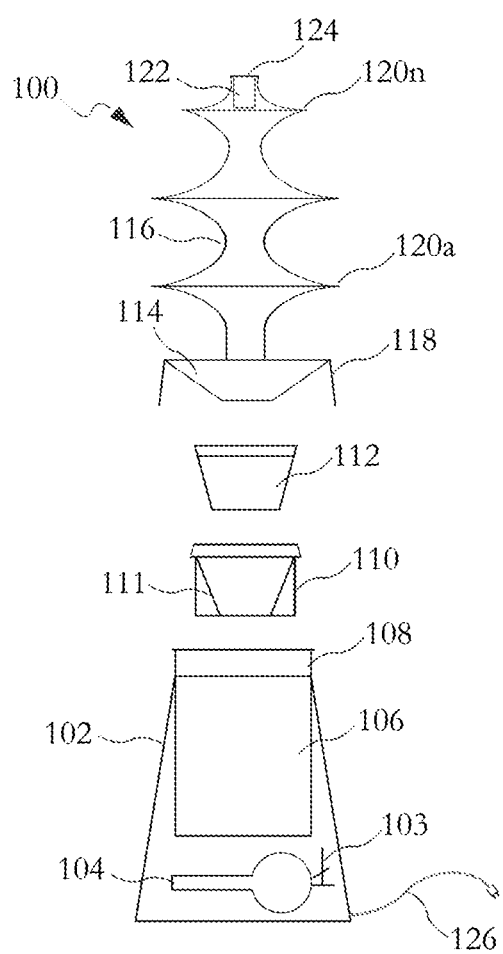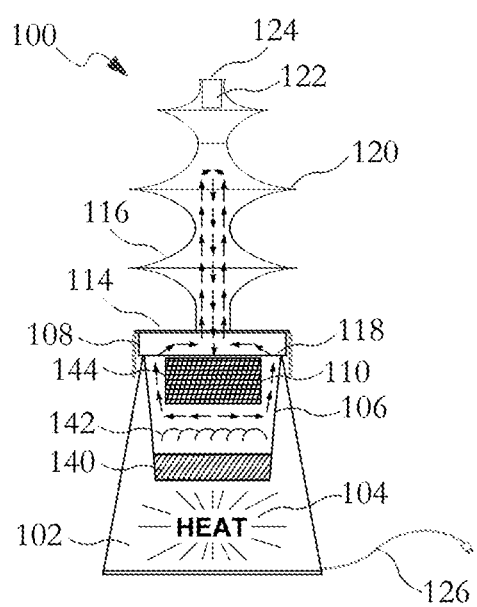
FIG. 1
FIG. 2

OIL EXTRACTION DEVICE FOR USE AT HOME AND METHOD OF USE

BACKGROUND OF THE INVENTION

1. Field of the Invention

The present invention relates to a household appliance to extract and collect oils from plants or other organic substances.

2. Description of Related Art

The technology and process for extractions is not a new procedure. Extractions are currently used for vitamins, perfumes, soaps, medications and many other commonly used products. Specifically, oil extractions are widely used as a process call soxhletting. A soxhlet extractor removes the lipids (or fats) from a solid material to isolate the lipids. The lipids may then be used in other commercial products. Typically, a soxhlet extractor is used in a lab under supervision of a chemist, laboratory worker or another person trained to use the complicated lab equipment. A problem with common extracting devices is that they are typically made for industrial use rather than for personal household consumption. For this reason the equipment is often large, fragile, comprises many equipment pieces, is difficult to handle or requires special training.

Nowadays, many people enjoy essential oils, which is basically the extracted oil of a plant. Some essential oils may contain health benefits or otherwise offer a pleasing smell or taste. Often in order to obtain the oils the person at boutique or health food stores carrying the specialized product must pay high prices for small quantities. Alternatively, if the person is skilled in laboratory techniques they may extract their own essential oil.

It would be beneficial in the art to provide a device and method for a person to extract their own essential oils at home. It would also be desirable in the art to provide a device that allows the user to extract the oils from any plant of their choosing.

SUMMARY OF THE INVENTION

In view of the foregoing disadvantages inherent in the prior art, the purpose of the present disclosure is to provide a household appliance to extract and collect oils from plants or other organic substances.

An object of the invention is to provide a device and method of use for a person to extract their own essential oils at home.

To achieve the above objects, in an aspect of the present invention, an oil extraction device is provided comprising a housing; a first trough resting within an upper portion of said housing, where said first trough holds a solvent; a heat source within said housing; where said heat source heats said first trough; a control device mounted within said housing, where said control device controls said heat source; a reservoir attached to said upper portion of said housing; a strainer basket positioned within said reservoir, where said strainer basket holds an extraction substance; a filter fitted within said strainer basket below said extraction substance; a second filter positioned above said extraction substance; a condenser positioned above said housing; a second trough positioned at a bottom portion of said condenser, where said second trough holds water; and a set of flanges extruding from said condenser, where said set of flanges enable said condenser to cool and condense solvent vapor when operating said oil extraction device.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIG. 1 depicts an exploded view of an oil extraction device in accordance with an exemplary embodiment of the present invention;

FIG. 2 depicts a perspective view of an oil extraction device in accordance with an exemplary embodiment of the present invention;

Like reference numerals refer to like parts throughout the description of several views of the drawings.

DETAILED DESCRIPTION OF THE DRAWINGS

Figure 3:
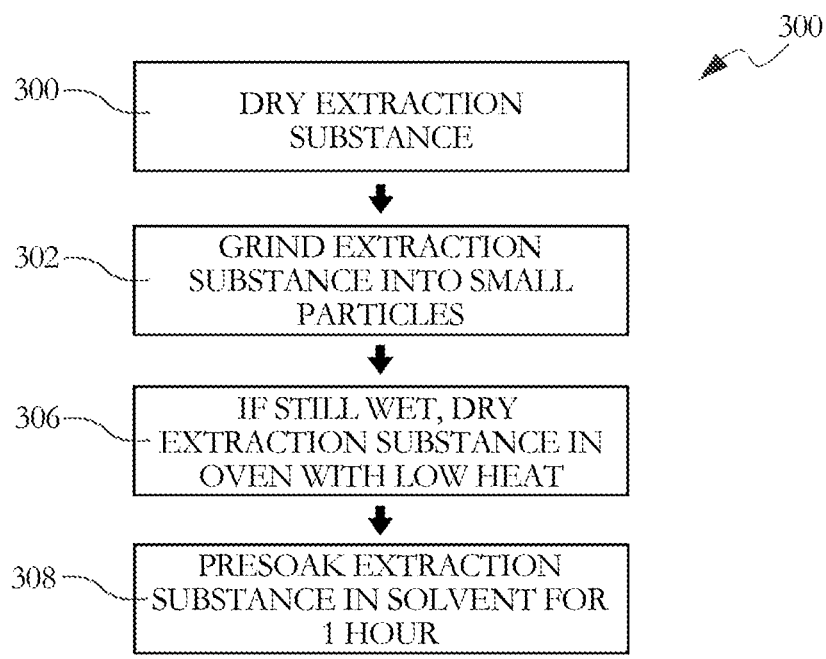
FIG. 3 depicts a flow diagram for substance preparation in accordance with an exemplary embodiment of the present invention.

The present invention relates to an appliance to remove and collect oils from plants. Specifically, the present invention is a oil extraction device, to extract the essential oils from a variety of plants, plant substances or other organic substances. The oil extraction device includes a simple design for uncomplicated, energy-efficient and consistent results. A user does not have to be trained in using complicated lab equipment. The oil extraction device uses a process called soxhletting wherein as an alcohol is heated, it begins to evaporate and travels within the oil extraction device, into a condenser where it then condenses back into liquid form. When it liquid form the alcohol leaches the essential oils from the plant so that the oils can be isolated for later use. The oil extraction device utilizes a three-part extraction process consisting of an extraction cycle, a separation cycle and a retrieval process. With the three-part extraction process a home user may simply and easily extract their own oils from their favorite plants and plant substances.

Turning now descriptively to the drawings, referring to FIG. 1, an exploded view of an oil extraction device (100) is shown in accordance with an exemplary embodiment of the present invention. At a base of the oil extraction device (100) is a housing (102) to hold and contain the equipment pieces of the oil extraction device (100). The housing (102) may be a vessel or container to uphold the oil extraction device (100), and may provide a stable platform for all of the extraction pieces. Built within the housing (102) is a control device (103). The control device (103) may be a rheostat which includes a dial mounted to the wall of the housing (102) to control the amount of electricity running through the oil extraction device (100). The dial may include a series of numbers from 1-10 to reflect the power level used while operating the oil extraction device (100). The control device (103) may be powered by a cord (126) that plugs into an electrical outlet or a battery pack built into the housing (102).

Within a bottom portion of the housing (102) is a heat source (104). The heat source (104) may be a light bulb (as shown), an electrical heating coil, a flame or another commonly used heating element known and used in the art. The control device (103) controls the heating source (104) to increase and decrease the heat.

Positioned above the heat source (104) is a first trough (106). The first trough (106) is suspended above the heat source (104) by a lip or hook that engages the top of the housing (102). The heat source (104) warms and heats the first trough (106) and any substances that may be there contained. Resting above the first trough (106) and upon the top of the housing (102) is a reservoir (108). The reservoir (108) is a stainless steel container to collect and funnel any overflow or condensed liquids.

Accordingly, fitting within the reservoir (108) and the first trough (106) is a strainer basket (110). Small holes are evenly spread throughout the surface of the strainer basket (110) to allow liquids to drip into the first trough (106). Placed within the strainer basket (110) is a filter (111). The filter (111) may be a material like a coffee filter or another porous material that allows liquids to drip through but prevents solid substances from draining. A second filter is also used with the strainer basket (110) and is placed upon the filter (111) within the strainer basket (110) during an extraction cycle, which will be explained below. Additionally, a reclamation cup (112) is placed in the strainer basket (110) during a separation cycle which will be explained below. The reclamation cup (112) is a solid container without any holes or openings.

The final piece of equipment for the oil extraction device (100) is a condenser (116). The condenser (116) may comprise a tubular body with a set of flanges (120) extending from a central portion of the condenser (116). The set of flanges (120) are arranged with the widest flange (120a) at the bottom of the condenser (116) and the narrowest flange (120n) towards the top of the condenser (116). The condenser (116) is fastened above the housing (102) with a fastener (118). The fastener (118) may be a pair of springs, hooks or clamps which engage a bottom portion of the condenser (116) with the top of the housing (102).

At a base of the condenser (116) is a second trough (114). The second trough (114) holds the water to be used during the extraction cycle. At the topmost portion of the condenser (116) or the tip is a chamber (122). The chamber (122) holds a portion of charcoal and includes a stopper (124) to plug the top portion of the condenser (116).

Referring now to FIG. 2 a perspective view of the oil extraction device (100) is shown in accordance to an exemplary embodiment of the present invention. FIG. 2 illustrates the oil extraction device (100) fully assembled and it illustrates an extraction cycle flowing through the oil extraction device (100). The oil extraction device (100) operates by a process called soxhletting. First, within the first trough (106) is a solvent (140). Upon heating by the heat source (104), the solvent (140) evaporates and becomes vapors (142). The vapors (142) then rise and, following the path of the drawn arrows, travel up into the condenser (116). Once in the condenser (116), the vapors (142) cool and collect on the inner walls of the condenser (116). Next, the vapors (142) condense back into liquid form and drop onto an extraction substance (144) within the strainer basket (110). As the solvent (140) flows through the extraction substance (144), through the strainer basket (110) and back into the first trough (106), small portions of oil are extracted from the extraction substance (144). The extraction substance (144) may be a plant, flower, seed or another organic substance from which oil is desired to be extracted. Although many plants, flowers and seeds are edible some may be poisonous. Therefore, a user must ensure that the extraction substance (144) is researched before extraction.

Referring to FIG. 3, a flow diagram for extraction substance preparation (300) is shown in accordance with an exemplary embodiment of the present invention. Before the extraction substance preparation (300) begins the user may remove stems or seeds from the extraction substance. The stems and seeds may be used for another extraction cycle. The flow diagram for extraction substance preparation (300) includes the steps:

1. (302) Drying the extraction substance.
2. (304) Grinding the extraction substance into small particles (304). A blender, chopper or a mortar and pestle may be used for grinding and chopping.
3. (306) If the extraction substance is still wet after grinding, dry the extraction substance in an oven on low heat until completely dry.
4. (308) Presoak the extraction substance in a solvent for one hour.

The solvent may be isopropyl alcohol, which is the most commonly used, water or another appropriate solvent having the ability to extract the oil from a plant, seed or flower. The amount of extraction substance used correlates to the amount of solvent used. For example, if 1-6 ounces of extraction substance are going to be extracted, then at least 24 ounces of solvent are used. Alternatively, if 7-12 ounces (not to exceed 12) of extraction substance are used then at least 30 ounces of solvent are used.

Figure 4:
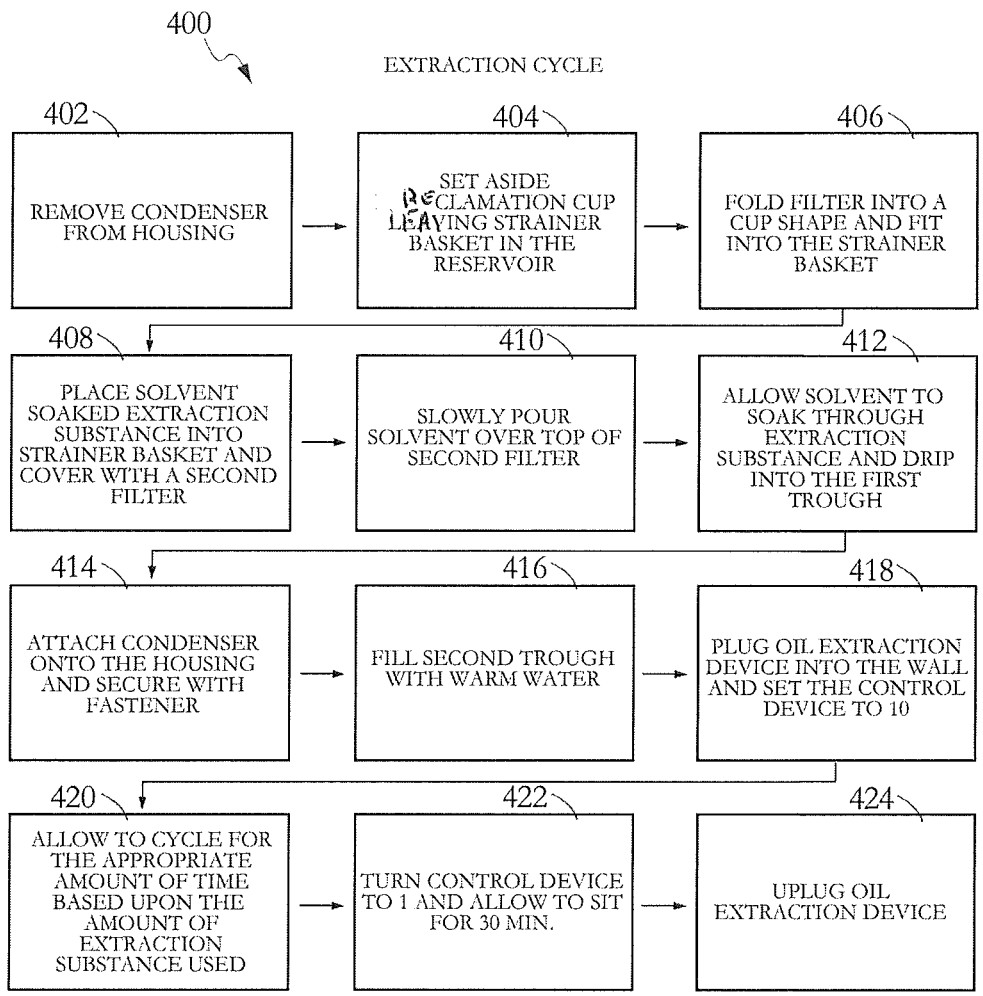
FIG. 4 depicts a flow diagram for an extraction cycle in accordance with an exemplary embodiment of the present invention.

Referring to FIG. 4, a flow diagram for an extraction cycle (400) is shown in accordance with an exemplary embodiment of the present invention. The oil extraction device comprises a three-step extraction process comprising an extraction cycle (400), a separation cycle (500) and an oil retrieval process (600). The steps for the extraction cycle (400) include:

1. (402) Remove the condenser from the housing.
2. (404) Set aside the reclamation cup, leaving the strainer basket in the reservoir.
3. (406) Fold the filter into a cup shape and fit it into the strainer basket. The filter may prevent the extraction substance from falling through the holes in the strainer basket.
4. (408) Place the solvent soaked extraction substance into the strainer basket on top of the filter and cover with a second filter.
5. (410) Slowly pour solvent over top of the second filter.
6. (412) Allow solvent to soak through extraction substance and drip through the strainer basket into the first trough.
7. (414) Attach the condenser onto the housing and secure with the fasteners.
8. (416) Fill the second trough with warm water.
9. (418) Plug the oil extraction device into the wall and set the control device to 10.
10. (420) Allow the device to cycle for the amount of time that coordinates with the amount and type of extraction substance used.
11. (422) Turn the control device to 1 and allow to sit for 30 minutes.
12. (424) Unplug the oil extraction device.

The time required for the extraction cycle (400) may take experimentation to find the exact time required. Altitude, humidity, substance type, room temperature, and so forth may all contribute to differences in extraction time.

After the extraction cycle (400) the extraction substance may be tested for completeness. To test the extraction substance, first carefully remove the condenser from the first and second trough. Remove the small filter and scoop a sample of extraction substance. Dry the sample of extraction substance and observe color. If the extraction is complete, the sample will be brown throughout and a sandy color when crumbled. If the extraction is incomplete, the sample will retain dark colored particles. If the extraction is incomplete, replace the sample and the small filter and return the strainer basket to the housing. Continue to cycle the extraction cycle, starting at step (414). Once process is complete proceed to the next cycle.

Figure 5:
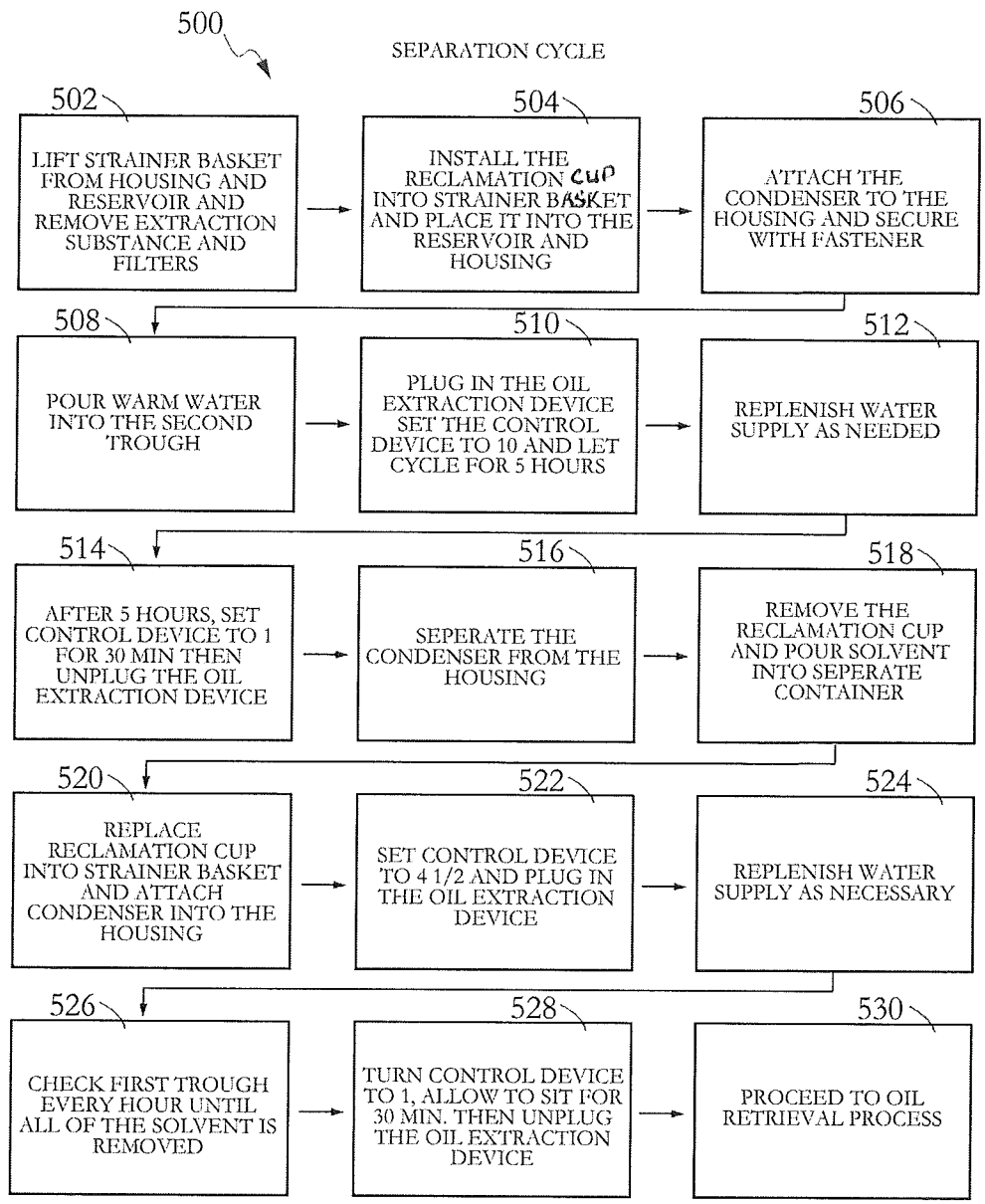
FIG. 5 depicts a flow diagram for a separation cycle in accordance with an exemplary embodiment of the present invention.

Referring to FIG. 5, a flow diagram for a separation cycle (500) is shown in accordance with an exemplary embodiment of the present invention. The steps for the separation cycle (500) include:

1. (502) Lift the strainer basket from the housing and reservoir and remove the extraction substance and the filters.
2. (504) Install the reclamation cup into the strainer basket and place it into the reservoir and the housing. The reclamation cup collects the solvent as it drips from the condenser.
3. (506) Attach the condenser to the housing and secure with fastener.
4. (508) Pour warm water into the second trough.
5. (510) Plug in the oil extraction device, set the control device to 10 and let cycle for 5 hours.
6. (512) Replenish water supply as needed.
7. (514) After 5 hours, set control device to 1 for 30 min. then unplug the oil extraction device.
8. (516) Separate the condenser from the housing.
9. (518) Remove the reclamation cup and pour the solvent into a separate container. If the solvent used is an alcohol is may be stored and used again. If the solvent is water, dispose of it.
10. (520) Replace reclamation cup into the strainer basket and attach the condenser to the housing.
11. (522) Set the control device to 4½ and plug in the oil extraction device.
12. (524) Replenish water supply as necessary.
13. (526) Check first trough every hour until all of the solvent is removed.
14. (528) Turn the control device to 1, allow to sit for 30 min then unplug the oil extraction device.
15. (530) Proceed to the oil retrieval process.

Figure 6:
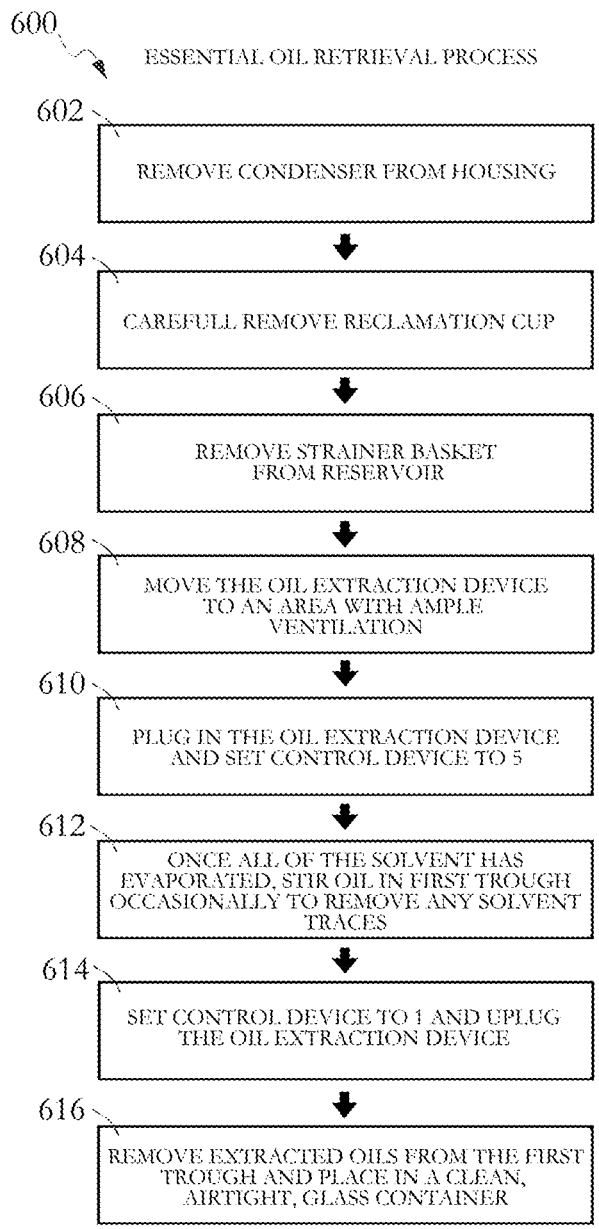
FIG. 6 depicts a flow diagram for an oil retrieval process in accordance with an exemplary embodiment of the present invention.

Referring to FIG. 6, a flow diagram for an essential oil retrieval process (600) is shown in accordance with an exemplary embodiment of the present invention. The steps for the oil retrieval process (600) include:

1. (602) Remove the condenser from the housing.
2. (604) Carefully remove the reclamation cup, and remove collected solvent.
3. (606) Remove strainer basket from the reservoir.
4. (608) Move the oil extraction device to an area with ample ventilation.
5. (610) Plug in the oil extraction device and set the control device to 5.
6. (612) Once all of the solvent has evaporated, stir oil in the first trough occasionally to remove any solvent traces.
7. (614) Set control device to 1 and unplug the oil extraction device.
8. (618) Remove the extracted oils from the first trough and place in a clean, airtight, glass container.

After extraction the extracted oils may be thin or thick and tar-like. Depending on the type of extraction substance used the extracted oils may have a variety of different uses. Whether the extracted oils are used for aromatic purposes, health benefits or flavorings the oil extraction device allows a user to extract their own oils at home with a small and easy to use appliance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An oil extraction device comprising;
   a housing at a bottom portion of the oil extraction device;
   a first trough resting within said housing; where said first trough holds a solvent;
   a heat source within said housing below the first trough, where said heat source heats said first trough and said solvent;
   a control device mounted within said housing, where said control device controls said heat source;
   a reservoir attached to an upper portion of said housing above the first trough;
   a strainer basket positioned within said reservoir, where said strainer basket includes a plurality of holes and said strainer basket holds an extraction substance;
   a filter fitted within said strainer basket below said extraction substance;
   a second filter positioned above said extraction substance;
   a condenser positioned above said housing; where said condenser comprises a tubular body;
   a second trough positioned at a bottom portion of said condenser; where said second trough holds water; and
   a set of flanges extruding from said condenser, with a widest flange at the bottom of the condenser and a narrowest flange at the top of the condenser, where said set of flanges enable said condenser to cool and condense solvent vapor when operating said oil extraction device, wherein said solvent vapors condense back to liquid form and drop onto the extraction substance flowing through the extraction substance to extract oil from the extraction substance.

2. The oil extraction device according to claim 1, wherein said strainer basket includes a reclamation cup.

3. The oil extraction device according to claim 1, wherein said housing includes an electrical plug to power said oil extraction device.

4. The oil extraction device according to claim 1, wherein said set of flanges are arranged from a widest flange up to a narrowest flange.

5. The oil extraction device according to claim 1, wherein said solvent is isopropyl alcohol.

6. The oil extraction device according to claim 1, wherein said condenser is secured to said housing with a fastener.

7. The oil extraction device according to claim 6, wherein said fastener is one of at least a spring, a hook and a clamp.

8. The oil extraction device according to claim 1, wherein the extraction substance includes an organic substance.

9. The oil extraction device according to claim 8, wherein the organic substance includes at least one of a plant, flower or seed.

\* \* \* \* \*